(12) United States Patent
Valverde

(10) Patent No.: US 7,921,502 B1
(45) Date of Patent: Apr. 12, 2011

(54) SNOW REMOVAL SYSTEM FOR VEHICLE ROOFTOPS

(76) Inventor: Wilmar Valverde, Seymour, CT (US)

( * ) Notice: Subject to any disclaimer, the term of this patent is extended or adjusted under 35 U.S.C. 154(b) by 714 days.

(21) Appl. No.: 12/015,952

(22) Filed: Jan. 17, 2008

(51) Int. Cl.
*B60S 3/04* (2006.01)

(52) U.S. Cl. .............................. 15/246; 15/53.1; 15/97.3

(58) Field of Classification Search .................. 37/196, 37/208, 219, 231; 414/509, 512, 513, 527; 15/246, 53.1, 53.2, 53.3, 97.3, DIG. 2
See application file for complete search history.

(56) References Cited

U.S. PATENT DOCUMENTS

| | | | |
|---|---|---|---|
| 4,131,834 A | 12/1978 | Blaszkowski | |
| 5,654,617 A | 8/1997 | Mills | |
| 5,801,307 A | 9/1998 | Netzer | |
| 5,896,018 A | 4/1999 | Pientka et al. | |
| 5,902,090 A * | 5/1999 | Young et al. | 414/527 |
| 5,949,150 A | 9/1999 | MacDonald | |
| D445,754 S | 7/2001 | Benoit | |
| 6,453,500 B1 * | 9/2002 | Schmitt | 15/97.3 |
| 7,617,561 B2 * | 11/2009 | Couture | 15/306.1 |
| 7,650,660 B1 * | 1/2010 | Duncan, Sr. | 15/97.3 |
| 2008/0184506 A1 * | 8/2008 | Dix et al. | 15/97.3 |
| 2010/0059089 A1 * | 3/2010 | Opdyke | 134/37 |

* cited by examiner

*Primary Examiner* — Dung Van Nguyen

(57) ABSTRACT

This patent discloses a system to remove accumulated snow and ice from the trailer rooftop of the semi-trailer truck. The system includes tracks, sensors, a control switch, a blade, an axle, a left cogwheel, a right cogwheel, a left motor, and a right motor. The tracks are attached to the trailer rooftop and the blade is connected to the tracks through the left cogwheel and the right cogwheel. The left and right cogwheel may rotate about the axle that passes through the blade. The left motor and the right motor are configured to be in communication with the sensors and control switch. If the sensors detect snow on the trailer rooftop or if the control switch is pressed, the motors cause the blade to move along the trailer rooftop to clear off any accumulated snow.

12 Claims, 5 Drawing Sheets

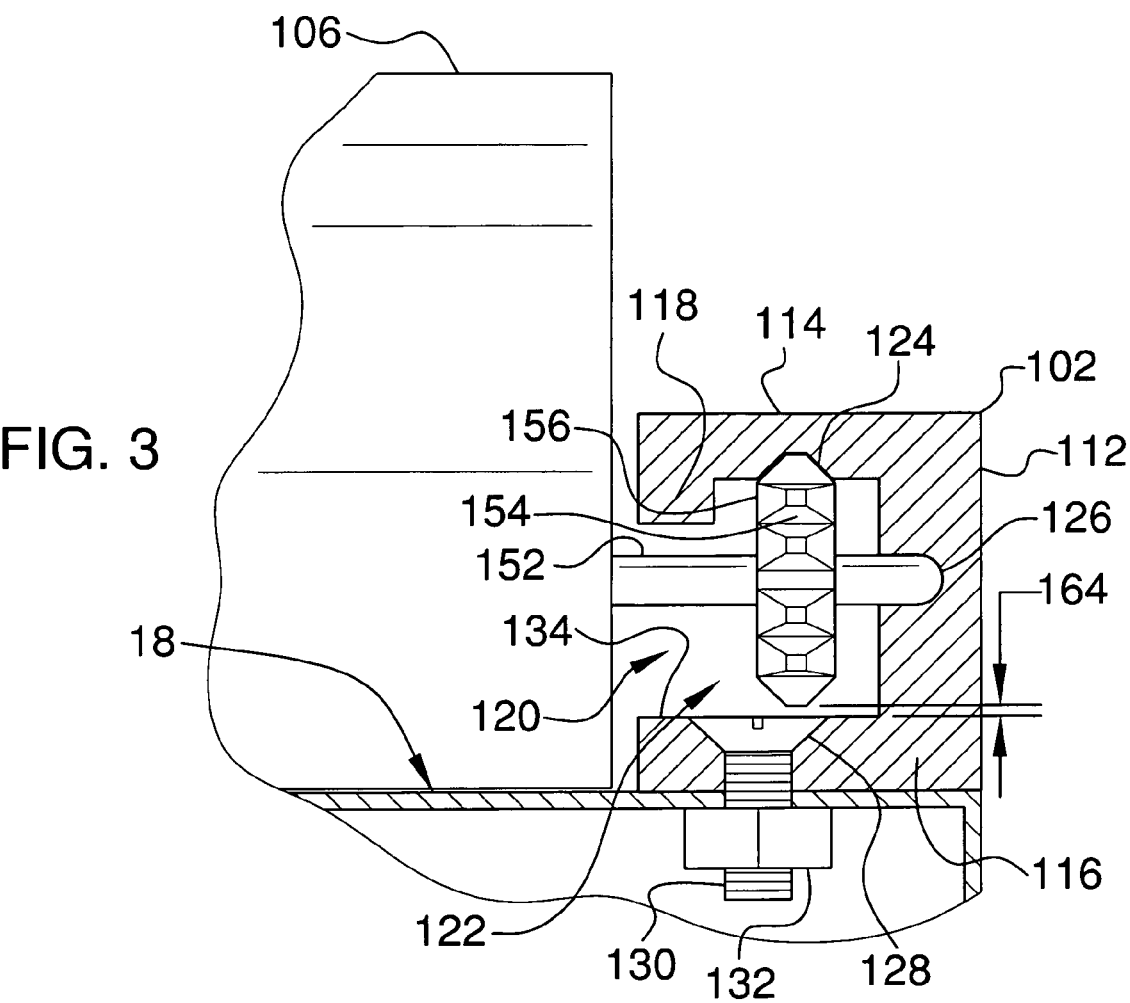
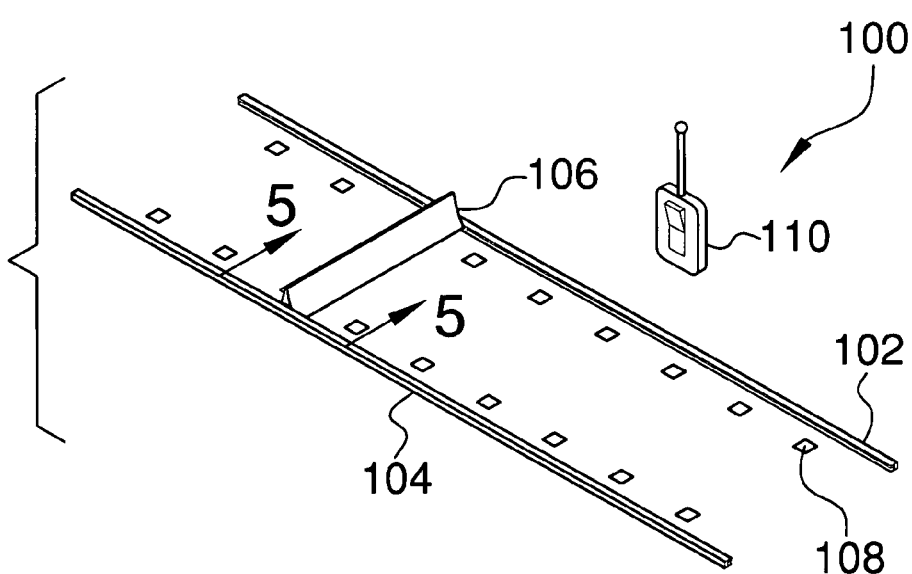

SNOW REMOVAL SYSTEM FOR VEHICLE ROOFTOPS

BACKGROUND

1. Field

The information disclosed in this patent relates to a system to remove snow accumulations from the rooftops of large commercial trailers, buses, and other vehicles.

2. Background Information

Semi-trailer trucks typically include a tractor having a cab where the driver sits. The tractor pulls a trailer that carries freight. Box trailers typically have a 53-foot long flat rooftop that resides 13.5 feet above the ground. In the colder claimants, snow and ice may accumulate on these large, flat surfaces while they are parked.

Accumulations falling from box trailers and other vehicles having large, flat rooftops pose a significant safety risk to drivers. For example, the accumulated snow and ice may be blown off or fly off the rooftop and onto unsuspecting vehicles sharing the roadway. Unsuspecting motorists may be temporarily blinded by this accumulated snow or receive serious vehicular damage from large chunks of ice leaving the rooftops of these big rigs.

Vehicle rooftop snow accumulations present other problems. For example, big rig drivers may be cited by the police if they carry accumulated snow on their rooftops. In addition, part of the insurance costs carried by many big rig drivers goes towards insuring against damage caused by rooftop accumulations. In addition, heavy ice and snow residing on the trailer rooftop affect the handling, aerodynamics, and highway fuel economy of these large vehicles.

Drivers sometimes climb on top of their trailer to manually clear off ice and snow accumulations with a broom or shovel. This is a near-impossible task and puts the driver at serious risk of slipping and falling from the trailer rooftop. What is needed is a system to address these and other problems.

SUMMARY

This patent discloses a system to remove accumulated snow and ice from the trailer rooftop of the semi-trailer truck. The system includes tracks, sensors, a control switch, a blade, an axle, a left cogwheel, a right cogwheel, a left motor, and a right motor. The tracks are attached to the trailer rooftop and the blade is connected to the tracks through the left cogwheel and the right cogwheel. The left and right cogwheel may rotate about the axle that passes through the blade. The left motor and the right motor are configured to be in communication with the sensors and control switch. If the sensors detect snow on the trailer rooftop or if the control switch is pressed, the motors cause the blade to move along the trailer rooftop to clear off any accumulated snow.

BRIEF DESCRIPTION OF THE FIGURES

FIG. 3 is a detailed view of an area around left rail 102 taken off line 3 of FIG. 2.

FIG. 4 is an isometric view of system 100 remote from vehicle 10.

DETAILED DESCRIPTION

Figure 1:
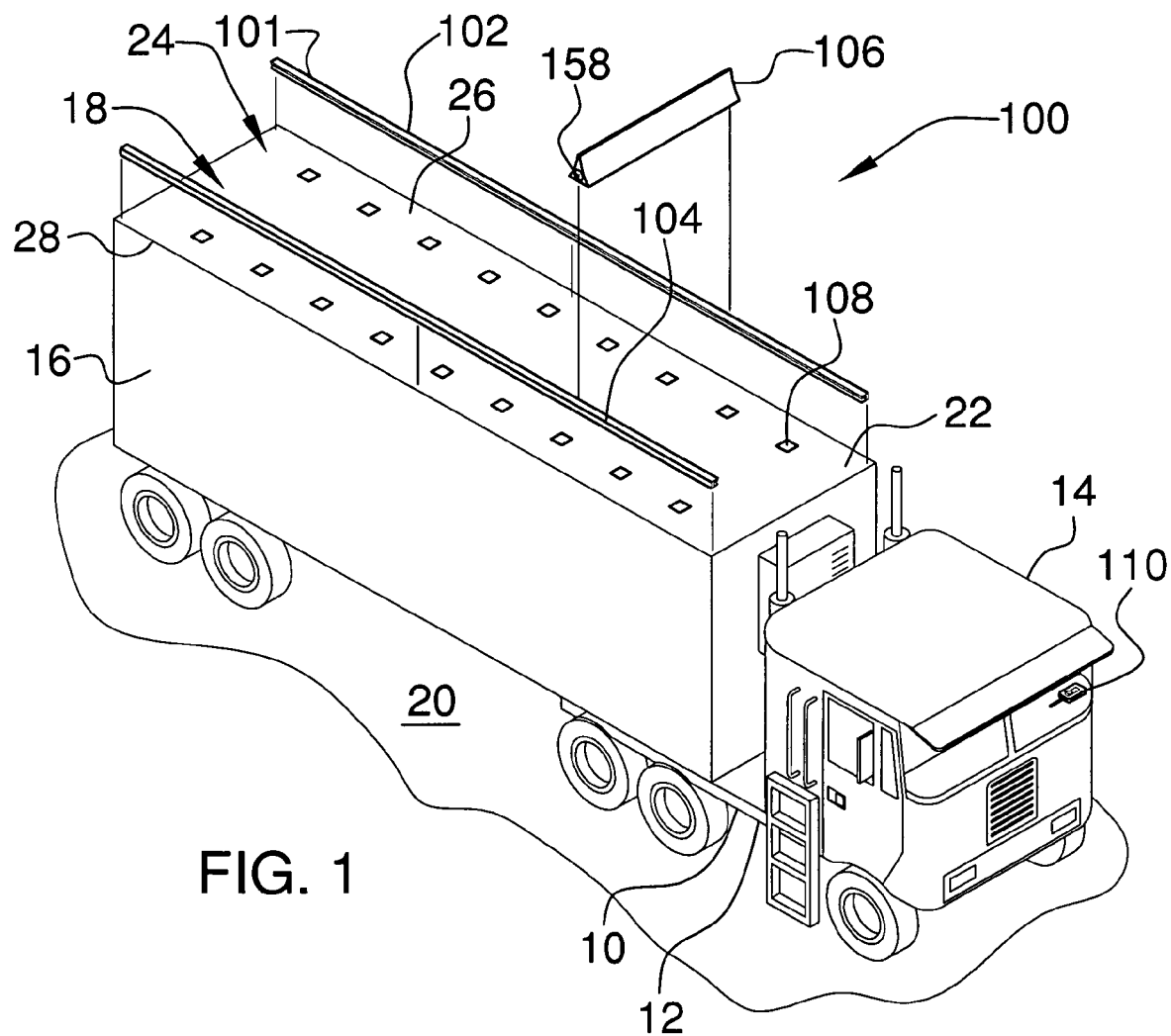
FIG. 1 is an isometric exploded view of a system 100 attached to a vehicle 10.

FIG. 1 is an isometric exploded view of a system 100 attached to a vehicle 10. Vehicle 10 may be a semi-trailer truck having a tractor 12 that may carry a cab 14 and may be configured to pull a trailer 16 that carries freight. Trailer 16 may have a vehicle rooftop 18 that substantially may be flat, very long, and reside high above a ground 20. In one example, vehicle rooftop 18 may be 53 feet long and reside 13.5 feet above ground 20. In the colder claimants, snow and ice may accumulate on vehicle rooftop 18 while vehicle 10 is parked. System 100 may be a system to remove snow and ice that has accumulated on rooftop 18.

System 100 may include tracks 101 having a left rail 102, a right rail 104, a blade 106, sensors 108, and control switch 110. Vehicle rooftop 18 may have a vehicle rooftop front 22 and a vehicle rooftop rear 24 both positioned between a vehicle rooftop left side 26 and a vehicle rooftop right side 28. The terms 'left' and 'right' may be relative to a driver sitting in cab 14. Left rail 102 may be positioned along a length of vehicle rooftop left side 26 and right rail 104 may be positioned along a length of vehicle rooftop right side 28. Blade 106 may be configured to engage and move along left rail 102 and right rail 104. Sensors 108 may be positioned along vehicle rooftop 18. Control switch 110 may be a toggle switch positioned within cab 14 that may be configured to turn on and off system 100.

Figure 2:
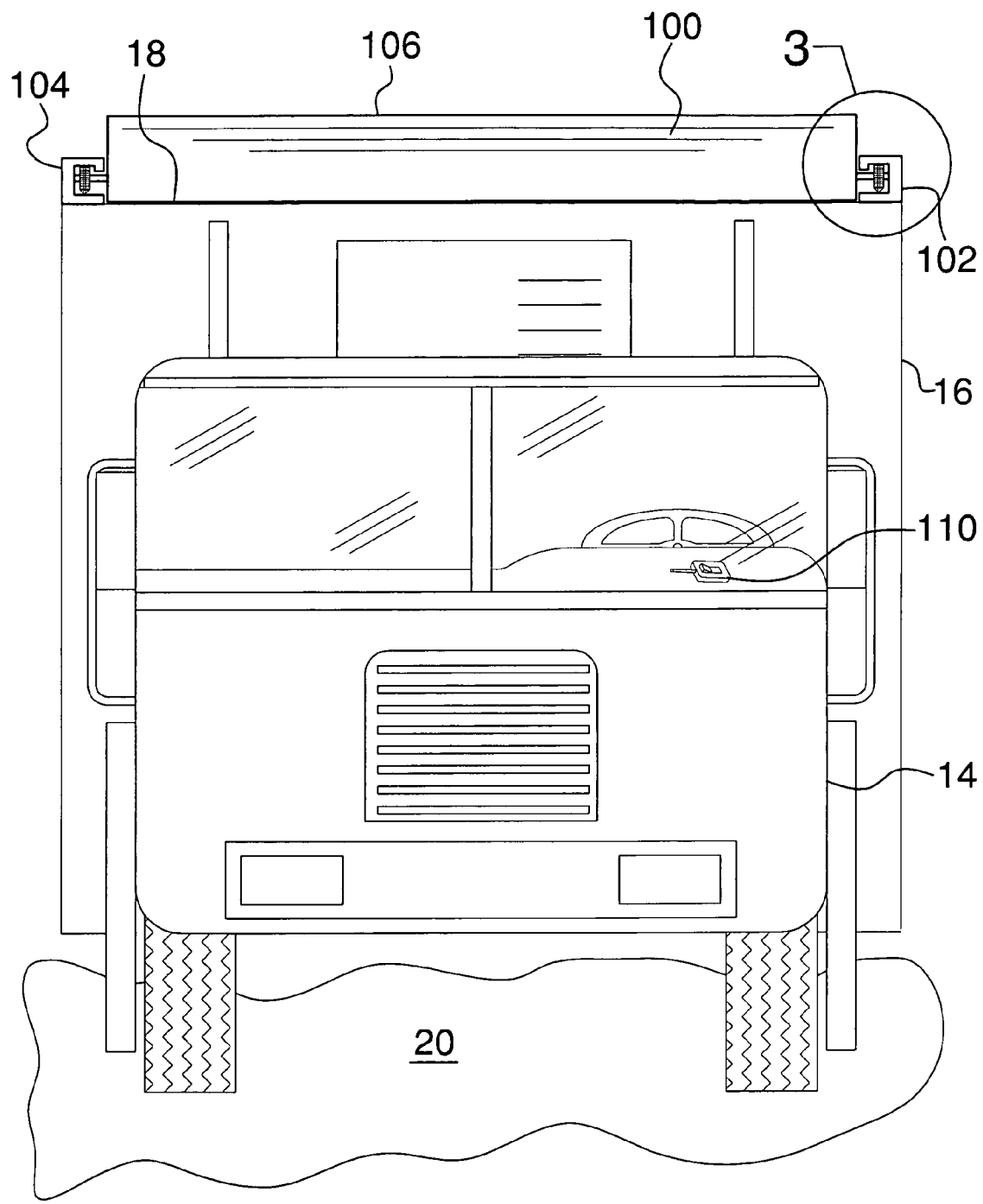
FIG. 2 is a front view of system 100 attached to vehicle 10.

FIG. 2 is a front view of system 100 attached to vehicle 10. Tracks 101 may include two parallel rails, left rail 102 and right rail 104, which may guide and steer blade 106 along vehicle rooftop 18. Each of left rail 102 and right rail 104 may be a toothed C-shaped rail bar configured to mesh with a cogwheel. The teeth of each toothed C-shaped rail bar may be thought of as a sector gear with an infinitely large radius of curvature. In one example, left rail 102 and right rail 104 may extend the entire length of vehicle rooftop 18, from vehicle rooftop front 22 to vehicle rooftop rear 24. Right rail 104 may have a structure similar to left rail 102 and may be interchanged with left rail 102.

FIG. 3 is a detailed view of an area around left rail 102 taken off line 3 of FIG. 2. Left rail 102 may have a left rail wall 112 attached between a left rail top 114 and a left rail base 116. A left rail lip 118 may extend down from left rail top to form a left rail gap 120 with left rail base 116 and to form a left rail cavity 122 with left rail wall 112, left rail top 114, and left rail base 116. Left rail 102 further may include left rail teeth 124 extending within and along left rail top 114 towards left rail base 116 and may include a left rail groove 126 extending into and along left rail wall 112. Left rail 102 additionally may include left rail holes 128 formed through left rail base 116.

Left rail wall 112 may be a solid, vertical structure that may elevate left rail top 114 above left rail base 116. Left rail top 114 may be a solid, horizontal structure positioned as an upper part of left rail 102. Left rail base 116 may be a solid, horizontal structure positioned as a lowest support of left rail 102. Left rail top 114 and left rail base 116 substantially may be parallel to each other and perpendicular to left rail wall 112 along the length of left rail 102. Left rail top 114 and left rail base 116 each may be attached offset to left rail wall 112 to form a C-channel. Left rail lip 118 may be an edge extending down from left rail top 114.

Left rail gap 120 may be an opening between left rail base 116 and left rail lip 118. Left rail cavity 122 may be a space surrounded by left rail wall 112, left rail top 114, left rail base 116, left rail lip 118, and left rail gap 120. Left rail gap 120 may provide open access to and from left rail cavity 122. Left rail cavity 122 may have a height that is greater than a height of left rail gap 120.

Left rail teeth 124 may be angled projections formed out of left rail top 114 so that left rail teeth 124 do not extend beyond left rail top 114. Left rail teeth 124 may be thought of as a sector gear with an infinitely large radius of curvature. Left rail groove 126 may be a long narrow furrow formed into left rail wall 112. A horizontal plane passing through left rail groove 126 and perpendicular to left rail wall 112 may be positioned above a midpoint between left rail top 114 and left rail base 116.

Left rail holes 128 may be openings passing through left rail base 116 to receive fasteners. For example, system 100 may include screws 130 and nuts 132. Screws 130 may be 82-degree flat heads attached to a spirally threaded cylindrical rod. Nuts 132 may be hardware fasteners having threaded holes to engage with similarly threaded cylindrical rods of screws 130. Left rail 102 may be secured to vehicle rooftop 18 by passing screws 130 through left rail holes 128 and corresponding holes in vehicle rooftop 18 and securing a nut 132 to each screw 130. Left rail holes 128 may be tapered so that screws 130 may remain flush with a left rail base upper surface 134 of left rail base 116.

Figure 5:
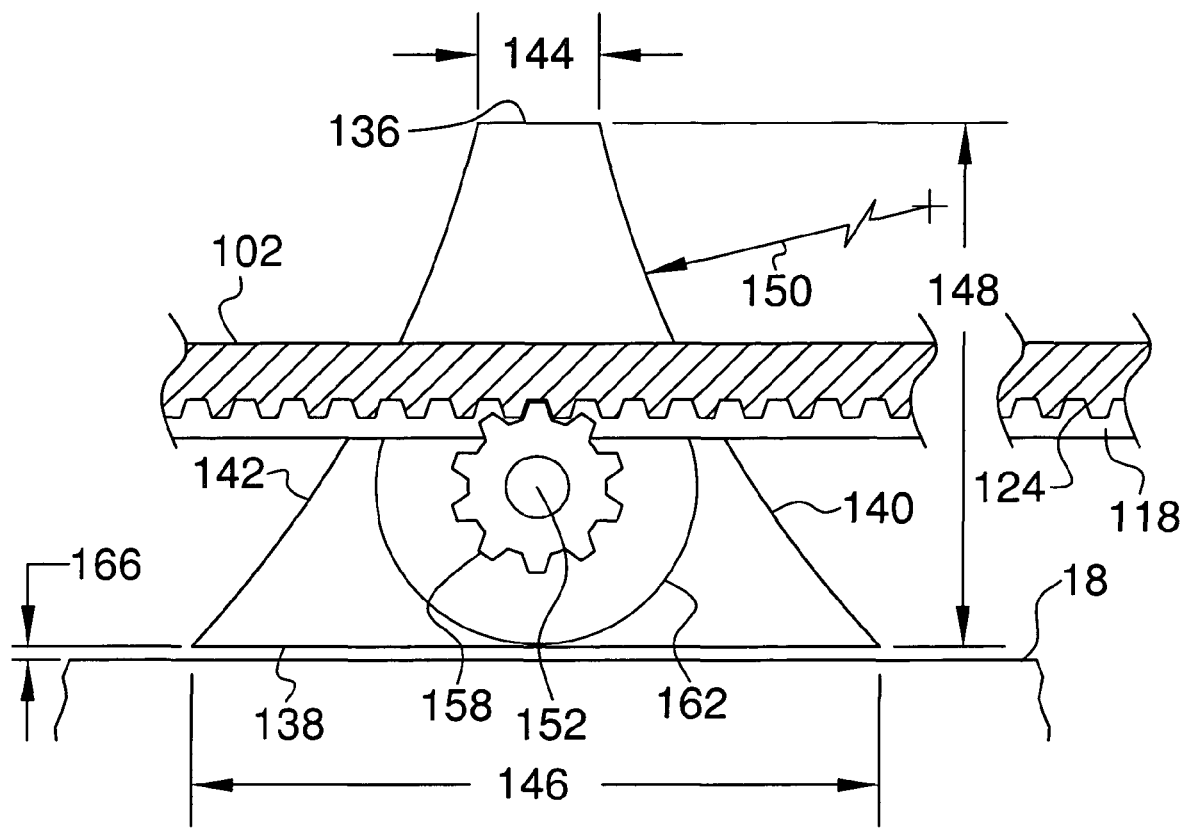
FIG. 5 is a side partial view of system 100 generally taken off line 5-5 of FIG. 4.
Figure 6:
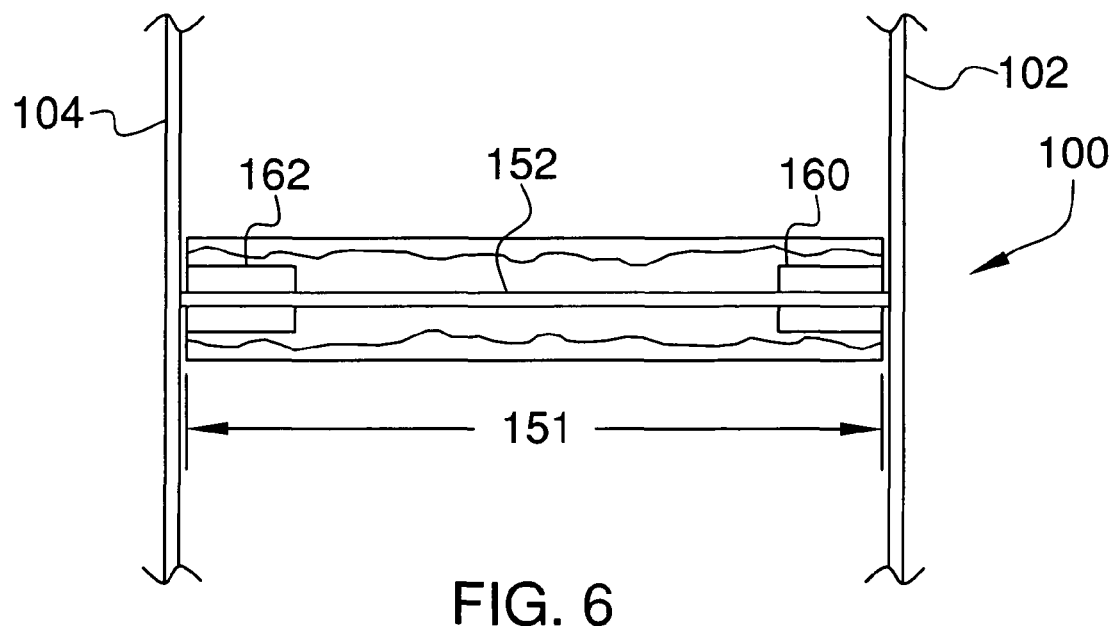
FIG. 6 is a top partial view system 100 remote from vehicle 10.

FIG. 4 is an isometric view of system 100 remote from vehicle 10. FIG. 5 is a side partial view of system 100 generally taken off line 5-5 of FIG. 4. FIG. 6 is a top partial view system 100 remote from vehicle 10.

Blade 106 may be a large plate configured to raise ice and snow from vehicle rooftop 18 and push the ice and snow in the direction of movement of blade 106. Blade 106 may have a triangular shape and include a blade top 136 and a blade bottom 138 positioned between a blade front 140 and a blade rear 142. Blade top 136 may have a blade top width 144 and blade bottom 138 may have a blade bottom width 146, where a ratio of blade bottom width 146 to blade top width 144 may be 20:3. Blade 106 may have a blade height 148 as measured from blade top 136 to blade bottom 138. In one example, blade height 148 may be six inches. In another example, a ratio of blade height 148 to blade bottom width 146 may be 7:10. Blade front 140 and blade rear 142 each may have curved surfaces that may oppose each other, where a blade curve radius 150 may define each curved surface. In one example blade, curve radius 150 may measure 20 to 25 inches. Blade 106 may have a blade length 151 (FIG. 6) that substantially may extend from left rail 102 to right rail 104.

Blade 106 may have holes passing from blade front 140 to blade rear 142 to make blade 106 aerodynamic. In one example, blade 106 may have fifteen holes passing from blade front 140 to blade rear 142, where each hole has a diameter approximately of one inch. In another example, blade 106 may have sixty-five holes passing from blade front 140 to blade rear 142.

Sensors 108 may be devices to detect a local depth of snow on vehicle rooftop 18. When a local depth of snow on vehicle rooftop 18 reaches a predetermined depth, system 100 may activate to remove snow from vehicle rooftop 18. For example, if a sensor 108 detects a snow depth of one or more inches, system 100 may activate to remove snow from vehicle rooftop 18.

In one example, sensors 108 may be positioned flush with vehicle rooftop 18. Each sensor 108 may send up a sound signal whose speed may be dependent upon the amount of snow accumulated above that sensor. Signals breaking through the snow will not echo back to the sensor. A depth of snow measurement may be determining by measuring the amount of power it takes to send out a signal from sensor 108 that does not completely echo back to sensor 108. In an alternate example, sensors 108 may send out a light signal and determine local snow depth based on the amount of light reflected back to sensor 108.

System 100 additionally may include an axle 152 (FIG. 3), pinions 154, including a left cogwheel 156 and a right cogwheel 158, left motor 160 (FIG. 6), and right motor 162 (FIG. 6). Axle 152 may extend through blade 106 to engage left cogwheel 156 and right cogwheel 158 (FIG. 1). Left motor 160 may be housed within blade 106 and positioned to engage left cogwheel 156. In addition, right motor 162 may be housed within blade 106 and positioned to engage right cogwheel 158.

Axle 152 may be a rod about which left cogwheel 156 and right cogwheel 158 may rotate. Pinions 154 may be toothed wheels that may rotate in response to motive force. Each pinion 154—left cogwheel 156 and right cogwheel 158—may be a round wheel having teeth that may mesh with left rail teeth 124 and right rail teeth respectively to allow force to be fully transferred without slippage.

Left motor 160 and right motor 162 may be machines to produce rotary mechanical force from electricity. Left motor 160 may be connected to left cogwheel 156 to rotate left cogwheel 156. Right motor 162 may be connected to right cogwheel 158 to rotate right cogwheel 158. Left motor 160 and right motor 162 may be battery powered or receive power through an electrical system of vehicle 10. Left motor 160 and right motor 162 may communicate with sensors 108 and control switch 110 through wireless communication and/or wire communication.

Left cogwheel 156 may engage left rail teeth 124 and right cogwheel 158 may engage a set of right rail teeth (not shown) of right rail 104. Axle 152 may be supported by left rail wall groove 126 (FIG. 3) and a right rail wall groove (not shown) so that left cogwheel 156 resides above left rail base upper surface 134 at a cogwheel clearance distance 164 (FIG. 3). Right cogwheel 158 may reside above a right rail base upper surface by cogwheel clearance distance 164 as well. In one example, cogwheel clearance distance 164 substantially may be one-quarter inch. Axle 152, left rail wall groove 126 and a right rail wall groove may elevate blade 106 off vehicle rooftop 18 to a blade-to-rooftop height 166 (FIG. 3). In one example, blade-to-rooftop height 164 approximately may be one inch.

Figure 7:
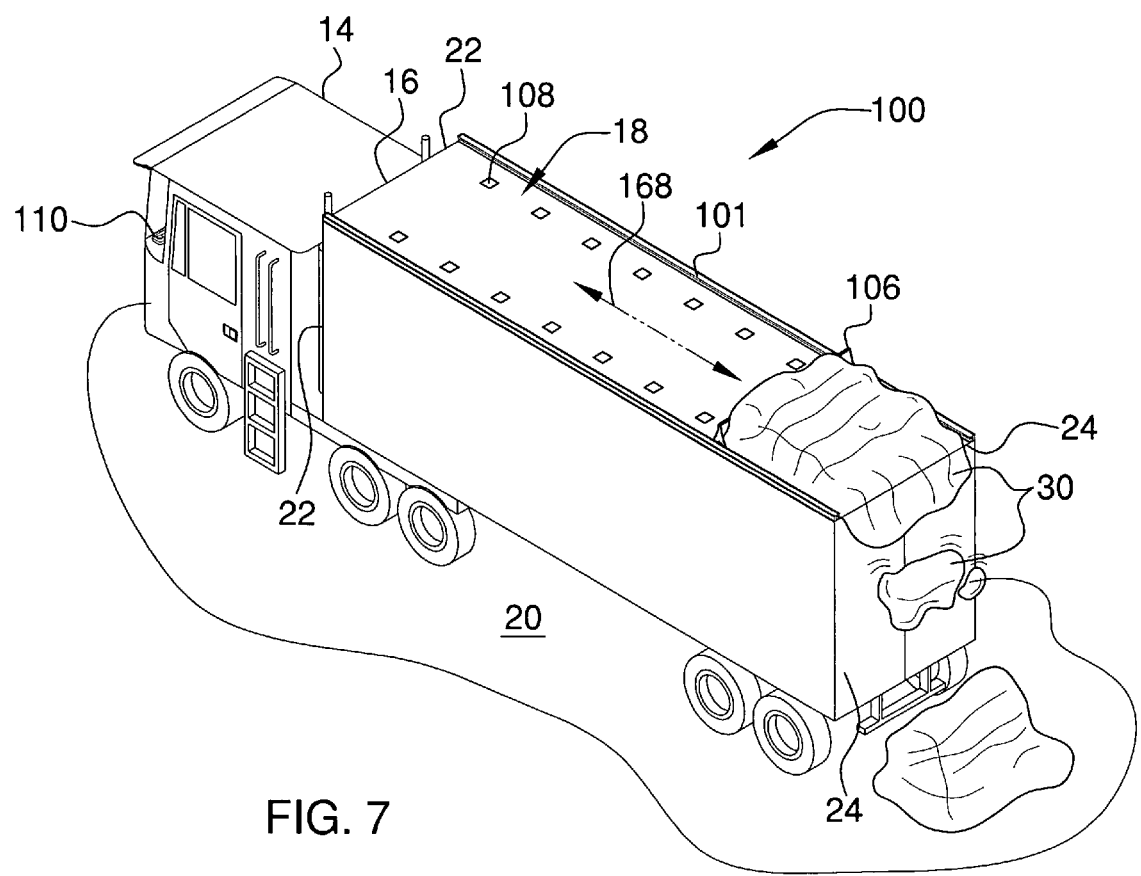
FIG. 7 is an isometric view of system 100 illustrating movement of system 100.

FIG. 7 is an isometric view of system 100 illustrating movement of system 100. Blade 106 may move if either sensors 108 detect one or more inches of snow on vehicle rooftop 18 or a truck driver presses control switch 110. In operation, blade 106 may move between vehicle rooftop front 22 and vehicle rooftop rear 24 in a direction of arrow 168. Movement of blade 106 along vehicle rooftop 18 may push snow and ice 30 onto ground 20.

The system may be an ice and snow removal system for the rooftops of large commercial trailers and buses. This system may clear ice and snow away to prevent it from accumulating and then blowing or flying off onto other following vehicles driven by unsuspecting motorists. It may help prevent serious vehicular damage and save lives of vulnerable motorists in the winter.

The system may include two electric motors, two guide tracks, a scraper blade, control switch, and sensors. The guide tracks may be installed along the left and right edges of the trailer rooftop and used to support the two electric motors. These motors may include gears engaged into teeth of the guides, enabling them to move together along the rooftop from front to rear and vice versa. Secured between the two weatherproof electric motors may be a scraper blade. This strong wiper blade may be double edged, enabling ice and snow to be removed regardless of the direction of movement.

The system may be wired to the electrical system of the semi-truck and controlled with sensors. The sensors may automatically activate the motorized blade anytime an ice or snow accumulation of one inch was detected. In addition, the truck driver may activate the system with a control switch within the cab.

This safety device may remove snow from roofs of tall vehicles before the accumulated snow can blow off and obstruct following driver's visibility. The system may detect snow and cause a large scraper to move back and forth across the roof of the vehicle. In addition to reducing the risk of a snow-covered trailer causing visibility related accidents for following vehicles, the system may make driving such large vehicles less stressful and may improve safety for the operators by eliminating a need to climb to the roof of the trailer and clear away the snow.

The snow removal system may feature a rubber wiper blade having a width as wide as the rooftop of the trailer and four roof-mounted sensors. A motor may be attached to the underside of each end of the blade. A pair of permanently installed tracks, with grooves or ridges on their top surfaces, may run the entire length of the rooftop. The motors may be aligned with these grooves. The system may include aluminum and hard rubber.

Upon detecting snow accumulation, the sensors may activate the blade mechanism to cause the blade to move back and forth across the entire roof to remove the snow and ice. Alternatively, the driver may operate the device using a button mounted inside the cab.

When traveling in ice and snow in the winter, the sensors of this system may automatically detect the accumulation of ice and snow to trigger the electric motors. This may force the motors back and forth along the rooftop guide tracks, thereby scraping away any frozen accumulations. They system may prevent large amounts of ice and snow from accumulating and then blowing off the rooftop onto following vehicles. In addition to being suitable for commercial van-style trailers, the system may be utilized in other applications, such as on rooftops of recreational vehicles, buses, straight trucks, and other types of mobile equipment.

The system may fulfill a need for scraping ice and snow from the rooftops of commercial vehicles. Appealing features of the system may be its safety, automatic operation, and effective cleaning action. Instead of ice and snow blowing off a commercial truck on the highway, the system scraped it away neatly. This may prevent other unsuspecting motorists from being blinded temporarily by snow or incurring serious vehicular damage from large chunks of falling ice. The system may help maintain a high level of travel safety in the winter, prevent possible citations from the police, and reduce insurance rates for trucking firms.

The system may be much faster and safer than attempting to climb atop the trailer for the near-impossible task of manually clearing ice and snow accumulations with a broom or shovel. It may prevent substantial delays and the possibility of slipping and falling from the trailer rooftop. The truck may experience improved handling, aerodynamics, and fuel economy on the highway with heavy ice and snow removed at the rooftop.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A system to remove accumulated snow and ice from the trailer rooftop of a semi-trailer truck, the system comprising:
    tracks having a left rail attached to and extending along a left side of the trailer rooftop and a right rail attached to and extending along a right side of the trailer rooftop, where the left rail and the right rail each include teeth configured to mesh with a cogwheel;
    a blade generally having a triangular shape, where the blade includes a blade top and a blade bottom positioned between a blade front and a blade rear, where the blade front and the blade rear have curved surfaces that oppose each other;
    an axle that extends through the blade;
    a left cogwheel attached to a left end of the axle, where the left cogwheel is meshed with the left rail;
    a right cogwheel attached to a right end of the axle, where the right cogwheel is meshed with the right rail;
    a left motor positioned to engage the left cogwheel;
    a right motor positioned to engage the right cogwheel;
    sensors embedded in the vehicle rooftop, where each sensor is configured to detect a depth of snow accumulated above that sensor and is configured to be in communication with the left motor and the right motor; and
    a control switch configured to be in communication with the sensors, the left motor, and the right motor, where the left motor and the right motor are configured to move the blade along the trailer rooftop by rotating the left cogwheel and the right cogwheel, respectively, in response to a signal from one of the sensors and the control switch.

2. The system of claim 1, where the control switch is a toggle switch positioned within a cab of the semi-trailer truck and configured to turn on and off the left motor and the right motor.

3. The system of claim 1, where the left rail and the right rail each are C-shaped rails having a groove, where the axle fists into the grooves, and where the grooves are positioned to elevate the left cogwheel and the right cogwheel off a left rail base of the left rail.

4. The system of claim 3, where the blade is elevated off the trailer rooftop.

5. The system of claim 1, where the blade includes a blade length that substantially extends from the left rail to the right rail and where the tracks extend the entire length of the trailer rooftop.

6. A system to remove accumulated snow and ice from a vehicle rooftop of a vehicle having a vehicle rooftop of at least fifty feet, the system comprising:
    tracks having teeth configured to mesh with cogwheels;
    a blade generally having a triangular shape, where the blade includes a blade top and a blade bottom positioned between a blade front and a blade rear, where the blade front and the blade rear have curved surfaces that oppose each other;
    an axle that extends through the blade and into grooves formed in the tracks;
    a left cogwheel attached to a left end of the axle, where the left cogwheel is meshed with the teeth of the tracks;
    a right cogwheel attached to a right end of the axle, where the right cogwheel is meshed with the teeth of the tracks;
    a left motor positioned to engage the left cogwheel;
    a right motor positioned to engage the right cogwheel; and a control switch configured to be in communication with the left motor and the right motor, where the left motor and the right motor are configured to move the blade along the trailer rooftop by rotating the left cogwheel and the right cogwheel, respectively, in response to a signal from the control switch.

7. The system of claim 6, further comprising:

sensors embedded in the vehicle rooftop, where each sensor is configured to detect a depth of snow accumulated above that sensor and is configured to be in communication with the left motor and the right motor, where the left motor and the right motor additionally are configured to move the blade along the trailer rooftop by rotating the left cogwheel and the right cogwheel, respectively, in response to a signal from one of the sensors.

8. The system of claim 7, where the tracks include a left rail attached to and extending along a left side of the trailer rooftop and a right rail attached to and extending along a right side of the trailer rooftop, where the left rail and the right rail each include teeth configured to mesh with a cogwheel.

9. The system of claim 6, where the control switch is a toggle switch positioned within a cab of the semi-trailer truck and configured to turn on and off the left motor and the right motor.

10. The system of claim 9, where the blade is elevated off the trailer rooftop.

11. A method to remove accumulated snow and ice from the trailer rooftop of a semi-trailer truck, the method comprising:

presenting a system to remove accumulated snow and ice from the trailer rooftop of the semi-trailer truck, where the system includes tracks, sensors, a control switch, a blade, an axle, a left cogwheel, a right cogwheel, a left motor, and a right motor, where the tracks have a left rail attached to and extending along a left side of the trailer rooftop and a right rail attached to and extending along a right side of the trailer rooftop, where the left rail and the right rail each include teeth configured to mesh with a cogwheel, where the blade generally includes a triangular shape, where the blade includes a blade top and a blade bottom positioned between a blade front and a blade rear, where the blade front and the blade rear have curved surfaces that oppose each other, where the axle extends through the blade, where the left cogwheel is attached to a left end of the axle and is meshed with the left rail, where the right cogwheel is attached to a right end of the axle and is meshed with the right rail, where the left motor is positioned to engage the left cogwheel, where the right motor is positioned to engage the right cogwheel, where the sensors are embedded in the vehicle rooftop, where each sensor is configured to detect a depth of snow accumulated above that sensor and is configured to be in communication with the left motor and the right motor, and where the control switch is configured to be in communication with the sensors, the left motor, and the right motor, where the left motor and the right motor are configured to move the blade along the trailer rooftop by rotating the left cogwheel and the right cogwheel, respectively, in response to a signal from one of the sensors and the control switch;

receiving a signal in the left motor and the right motor from one of the sensors and the control switch; and in response to the received signal, moving the blade along the trailer rooftop by using the left motor to rotate the left cogwheel and using the right motor to rotate the right cogwheel.

12. The method of claim 11, where the control switch is a toggle switch positioned within a cab of the semi-trailer truck and configured to turn on and off the left motor and the right motor.

\* \* \* \* \*